United States Patent
Ninomiya et al.

(10) Patent No.: US 6,559,254 B2
(45) Date of Patent: May 6, 2003

(54) METHOD OF PRODUCING A VINYL ACETATE POLYMER AND ITS SAPONIFICATION PRODUCT

(75) Inventors: Kenji Ninomiya, Kurashiki (JP); Yoshiharu Nagao, Kurashiki (JP); Akio Harao, Kurashiki (JP); Kenji Kato, Kurashiki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 72 days.

(21) Appl. No.: 09/781,553

(22) Filed: Feb. 13, 2001

(65) Prior Publication Data

US 2001/0056160 A1 Dec. 27, 2001

(30) Foreign Application Priority Data

Feb. 14, 2000 (JP) .......................................... 2000-034431

(51) Int. Cl.$^7$ ............................. C08F 18/08; C08F 8/12
(52) U.S. Cl. .................... 526/210; 526/212; 526/219.2; 526/219.6; 526/227; 526/230.5; 525/330.6; 524/379; 524/391
(58) Field of Search ................................. 526/210, 212, 526/227, 219.2, 219.6, 330, 331, 319, 230.5; 524/557, 379, 391; 525/330.6

(56) References Cited

U.S. PATENT DOCUMENTS

| | | | | |
|---|---|---|---|---|
| 4,543,401 A | * | 9/1985 | Gaylord | ...................... 526/204 |
| 4,954,567 A | * | 9/1990 | Oishi et al. | .................... 72/173 |
| 5,541,275 A | * | 7/1996 | Fleischmann et al. | ....... 526/266 |
| 6,245,851 B1 | * | 6/2001 | Petrocelli et al. | ........... 524/459 |
| 6,451,910 B1 | * | 9/2002 | Koyanagi et al. | ........... 524/854 |

FOREIGN PATENT DOCUMENTS

JP    9-316110    12/1997

OTHER PUBLICATIONS

Alger, "Polymer Science Dictionary", $2^{nd}$ ed., Chapman & Hall, New York, p. 187 (1997).*

* cited by examiner

*Primary Examiner*—D. R. Wilson
(74) *Attorney, Agent, or Firm*—Armstrong, Westerman & Hattori, LLP

(57) ABSTRACT

The invention provides a process for producing a saponified vinyl acetate polymer (a saponified ethylene-vinyl acetate copolymer in particular) which features a minimum of coloration of molding pellets, a well-inhibited emanation of an odor in melt-molding, a high transparency of the product film and a low incidence of fish-eyes in the film, and a process for producing a vinyl acetate polymer (particularly an ethylene-vinyl acetate copolymer) for use as the starting material for said saponified vinyl acetate polymer having said favorable properties. In accordance with the invention, either vinyl acetate alone or vinyl acetate and one or more other monomers are polymerized in the presence of a hydroxylactone compound and a polymerization catalyst. The resulting vinyl acetate polymer (particularly the ethylene-vinyl acetate copolymer) is then saponified.

3 Claims, No Drawings

METHOD OF PRODUCING A VINYL ACETATE POLYMER AND ITS SAPONIFICATION PRODUCT

FIELD OF THE INVENTION

The present invention relates generally to a technology of producing vinyl acetate polymers and saponification products thereof and more particularly to a process for producing an ethylene-vinyl acetate copolymer and a process for producing a saponified ethylene-vinyl acetate copolymer.

BACKGROUND OF THE INVENTION

The saponified ethylene-vinyl acetate copolymer has excellent gas-barrier properties, mechanical strength and other useful characteristics and, as such, is broadly used in various applications such as films, sheets, bags and fibers.

The saponified ethylene-vinyl acetate copolymer is produced by copolymerizing ethylene and vinyl acetate in a solvent and then saponifying the resulting copolymer. This copolymerization of ethylene and vinyl acetate is usually carried out in an alcohol solvent, such as methanol, in the presence of a catalyst, such as a peroxide or an azo compound.

JP Kokai H9-316110 discloses a technology of producing vinyl acetate polymers by way of homopolymerization of vinyl acetate monomer or copolymerization of vinyl acetate monomer and one or more other monomers copolymerizable therewith characterized in that an organic peroxide having a half-life of 10–110 minutes at 60° C. is used as a polymerization initiator and that the polymerization reaction is carried out in the presence of at least one carboxylic acid selected from the group consisting of hydroxycarboxylic acids and polycarboxylic acids or a salt thereof.

According to the above patent literature, the object of the invention disclosed is to provide a method of producing a vinyl acetate polymer which is conducive to a reduced amount of dissolved polymer in the waste liquor in the stage of saponification of a vinyl acetate polymer, a reduced amount of undissolved vinyl alcohol polymer in a solvent in the preparation of a solution of the vinyl alcohol polymer obtained by saponification of a vinyl acetate polymer, an improved clarity of the vinyl alcohol polymer solution obtained by the saponification of the vinyl acetate polymer, and a reduced odor of the vinyl alcohol polymer produced by the saponification of the vinyl acetate polymer.

As examples of said hydroxycarboxylic acids and polycarboxylic acids, the above literature mentions glycolic acid, lactic acid, glyceric acid, malic acid, tartaric acid, citric acid, salicyclic acid, malonic acid, succinic acid, maleic acid, phthalic acid, oxalic acid and glutaric acid. It is stated that the preferred, among these, are aliphatic saturated hydroxycarboxylic acids, particularly aliphatic saturated hydroxypolycarboxylic acids.

As said other monomer or monomers copolymerizable with vinyl acetate monomer, the same literature mentions olefins (ethylene, propylene, etc.), hydroxyolefins, (meth) acrylic acid esters, allyl compounds, nonionic monomers, anionic monomers and cationic monomers, but in view of the statement that these comonomers preferably constitute a minor component and the use of vinyl acetate monomer alone is particularly preferred, it is logical to assume that, even when a copolymer is indicated, the invention envisages only copolymers representing minor modifications of polyvinyl acetate.

The above invention disclosed in JP Kokai H9-316110 does not specifically refer to an ethylene-vinyl acetate copolymer with a comparatively high ethylene content.

The inventors of the present invention analyzed the rationale of using a hydroxycarboxylic acid and an organic peroxide in the polymerization system for producing an ethylene-vinyl acetate copolymer with a reasonably high ethylene content and found that when pellets of the saponification product of the ethylene-vinyl acetate copolymer so obtained was melt-formed into a film and the film was evaluated for the degree of discoloration of pellets, emanation of an odor at molding, the degree of transparency of the resulting film, and fish-eyes in the film, the product was not satisfactory enough in any of the above quality parameters.

OBJECT AND SUMMARY OF THE INVENTION

In the above state of the art, the present invention has for its primary object to provide a process for producing a saponified vinyl acetate polymer (a saponified ethylene-vinyl acetate copolymer in particular) with a minimum of pellet discoloration, a sufficient suppression of an odor in the melt-molding of pellets, high transparency of the film obtained, and a low incidence of film fish-eyes and a process for producing a vinyl acetate polymer (an ethylene-vinyl acetate copolymer in particular) for use as a raw material for said saponified polymer which is conducive to said desirable qualities.

The process for producing a vinyl acetate polymer according to the present invention is characterized in that, in the presence of a hydroxylactone compound and a polymerization catalyst, vinyl acetate is polymerized alone or copolymerized with one or more other copolymerizable monomers.

The process for producing a saponified vinyl acetate polymer according to the present invention is characterized in that, in the presence of a hydroxylactone compound and a polymerization catalyst, vinyl acetate is polymerized alone or copolymerized with one or more other copolymerizable monomers and the resulting vinyl acetate polymer is saponified.

DETAILED DESCRIPTION OF THE INVENTION

The present invention is now described in detail. It should be understood that the polymer with which the present invention is concerned is not limited to an ethylene-vinyl acetate copolymer inclusive of its saponification product but since this polymer is particularly important, the following description will be mainly directed to the ethylene-vinyl acetate polymer.

In producing an ethylene-vinyl acetate copolymer in accordance with the invention, ethylene and vinyl acetate are copolymerized. The method for this polymerization includes solution polymerization, bulk polymerization, suspension polymerization and emulsion polymerization. The preferred is solution polymerization or bulk polymerization. The mode of copolymerization may be continuous or batchwise, and suitable conditions, such as those described below, can be selectively used according to the specific polymerization technique selected.

According to the solution polymerization technique or bulk polymerization technique, the copolymerization of ethylene and vinyl acetate is conducted in the presence of a polymerization catalyst. The most outstanding feature of the present invention residues in that this copolymerization is carried out in the presence of a hydroxylactone compound described later herein.

The solvent for use in a solution polymerization process is not particularly restricted but any of the solvents which are conventionally used in the production of ethylene-vinyl acetate copolymers can be employed. For example, alcohols containing up to 4 carbon atoms, aliphatic hydrocarbons, aromatic hydrocarbons, fatty acid esters, and mixtures thereof can be mentioned. The alcohols mentioned above include methanol, ethanol and propanol, among others. A mixture of water with such an alcohol can also be employed.

The proportion of the solvent to be used in carrying out this copolymerization reaction is not particularly restricted but the preferred proportion is not more than 1000 parts by weight (more preferably not more than 100 parts by weight, particularly not more than 50 parts by weight) based on 100 parts by weight of vinyl acetate. Use of the solvent in excess of 1000 parts by weight is undesirable, for the molecular weight of the product copolymer will then be not as high as desired.

The polymerization catalyst may be virtually any radical initiator. Thus, use may be made of, for example, azo compounds such as 2,2'-azobis(2,4-dimethylvaleronitrile), 2,2'-azobis(2,4,4-trimethylvaleronitrile), 2,2'-azobisisobutyronitrile, 2,2'-azobis(4-methoxy-2,4-dimethylvaleronitrile), 2,2'-azobisisobutyrate, etc.; peroxy esters such as t-butyl peroxyneodecanoate, t-butyl peroxypivalate, t-butyl peroxy-2-ethylhexanoate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyisobutyrate, t-hexyl peroxypivalate, etc.; peroxydicarbonates such as di-n-butyl peroxydicarbonate, bis(4-t-butylcyclohexyl) peroxydicarbonate, dicyclohexyl peroxydicarbonate, bis(2-ethylhexyl)-di-sec-butyl peroxydicarbonate, di-n-propyl peroxydicarbonate, di-isopropyl peroxydicarbonate, di-sec-butyl peroxydicarbonate, di-2-ethoxyethyl peroxydicarbonate, di(2-ethylhexyl) peroxydicarbonate, dimethoxybutyl peroxydicarbonate, di(3-methyl-3-methoxybutylperoxy) dicarbonate, etc.; diacyl peroxides such as dibenzoyl peroxide, distearoyl peroxide, dilauroyl peroxide, dioctanoyl peroxide, didecanoyl peroxide, bis (3,3,5-trimethylhexanoyl) peroxide, diisobutyryl peroxide, dipropionyl peroxide, diacetyl peroxide, etc.; and so on.

The polymerization catalyst is preferably an azo compound or organic peroxide having a half-life time (t½) of 0.1–10 hours at 60° C.

As specific examples of such polymerization catalyst, there can be mentioned, among azo compounds, 2,2'-azobis-(2,4-dimethylvaleronitrile) [t½: 2.5 hr] and 2,2'-azobis(4-methoxy-2,4-dimethylvaleronitrile) [t½0.17 hr]; among peroxy esters, t-butyl peroxyneodecanoate [t½: 1.8 hr], t-butyl peroxypivalate [t½: 5.0 hr], α,α'-bis(neodecanoylperoxy)diisopropylbenzene [t½: 0.5 hr], cumyl peroxyneodecanoate [t½: 0.5 hr], 1,1,3,3-tetramethylbutyl peroxyneodecanoate [t½: 0.7 hr], 1-cyclohexyl-1-methylethyl peroxyneodecanoate [t½: 0.8 hr], t-hexyl peroxyneodecanoate [t½: 1.4 hr], t-hexyl peroxypivalate [t½: 4.2 hr], etc.; and among peroxydicarbonates, di-n-propyl peroxydicarbonate [t½: 0.7 hr], diisopropyl peroxydicarbonate [t½: 0.6 hr], di-sec-butyl peroxydicarbonate [t½: 0.7 hr], bis(4-t-butylcyclohexyl) peroxydicarbonate [t½: 0.7 hr] di-2-ethoxyethyl peroxydicarbonate [t½: 0.9 hr] di(2-ethylhexyl) peroxydicarbonate [t½: 0.9 hr], dimethoxybutyl peroxydicarbonate [t½: 1.6 hr], di(3-methyl-3-methoxybutylperoxy) dicarbonate [t½: 1.9 hr], etc.; and among diacyl peroxides, 3,3,5-trimethylhexanoyl peroxide [t½: 9.2 hr], diisobutyryl peroxide [t½: 0.3 hr] and so on.

The term "half-life" (t½) as used in connection with the polymerization catalyst means the value measured at 60° C. in toluene for azo compounds or in benzene for other catalysts. The method of measurement is as follows. The polymerization catalyst is dissolved in the solvent (toluene or benzene) at a final concentration of 0.1 mol/L and a N₂-purged glass tube is filled with the solution and sealed. This tube is then immersed in a constant-temperature bath at 60° C. and the concentration of the polymerization catalyst is monitored by a per se known technique. Then, from the immersion time and the concentration so measured, the time till the catalyst concentration has decreased to 2 of the initial concentration is found and taken as the half-life of the catalyst.

The preferred level of use of the polymerization catalyst in the case of the batch process is 0.002~0.5 part by weight (more preferably 0.005~0.1 part by weight, particularly 0.007~0.08 part by weight) based on 100 parts by weight of vinyl acetate. If the proportion of the catalyst is smaller than 0.002 part by weight, the catalyst efficiency will be so low as to prolong the polymerization time or interfere with smooth progress of polymerization. On the other hand, if the proportion of the catalyst exceeds 0.5 part by weight, the polymerization reaction may not be easily controlled or the catalyst remaining after completion of polymerization tends to cause postpolymerization.

The preferred level of use of the polymerization catalyst in the case of the continuous process is 0.002~0.1 part by weight (more preferably 0.005~0.07 part by weight, particularly 0.01~0.05 part by weight) based on 100 parts by weight of vinyl acetate. If the proportion of the catalyst is smaller than 0.002 part by weight, the catalyst efficiency will be so low as to prolong the polymerization time or interfere with smooth progress of polymerization. On the other hand, if the proportion of the catalyst exceeds 0.1 part by weight, the polymerization reaction may not be easily controlled or the catalyst remaining after completion of polymerization tends to cause postpolymerization.

From handling safety points of view, these polymerization catalysts are preferably diluted with a suitable solvent before feeding to a polymerization system. The preferred solvent for this purpose includes aliphatic hydrocarbons, aromatic hydrocarbons, fatty acid esters, alcohols such as methanol, ethanol and propanol, and mixtures thereof. It is also possible to use vinyl acetate as the diluent solvent depending on the objective but in such cases the concentration of vinyl acetate is preferably lowered to not more than 40 weight % by mixing it with a different solvent in order to avoid the risk of (untimely) polymerization. Furthermore, the polymerization catalyst may be fed to the polymerization system in the form of an aqueous emulsion.

In the present invention, the copolymerization of vinyl acetate and ethylene to give an ethylene-vinyl acetate copolymer is carried out in the presence of said polymerization catalyst and hydroxylactone compound.

The hydroxylactone compound is not particularly restricted insofar as it contains a lactone ring and a hydroxyl group within its molecule. Thus, for example, L-ascorbic acid, erythorbic acid, D-gluconic acid δ-lactone, etc. can be mentioned. Particularly preferred is L-ascorbic acid or erythorbic acid. For reference's sake, the chemical formulas of L-ascorbic acid, erythorbic acid and D-gluconic acid δ-lactone are shown below.

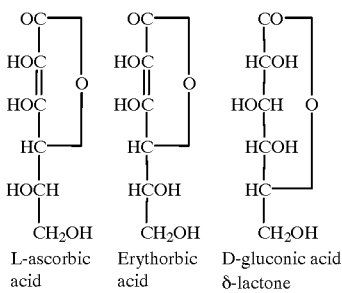

L-ascorbic acid    Erythorbic acid    D-gluconic acid δ-lactone

The level of use of the hydroxylactone compound relative to 100 parts by weight of vinyl acetate is 0.0001~0.1 part by weight (more preferably 0.0005~0.05 part by weight, particularly 0.001~0.03 part by weight) for both the batch process and the continuous process. If the level is below 0.0001 part by weight, the effect of the invention may not be obtained. On the other hand, if the level exceeds 0.1 part by weight, the polymerization of vinyl acetate will be interfered with.

The mode of feeding the hydroxylactone compound to the polymerization system is not particularly restricted but it is usually preferable to feed it as diluted beforehand with a solvent, such as a lower aliphatic alcohol, a fatty acid ester inclusive of vinyl acetate, or water, or a mixture thereof.

In the production process according to the present invention, the mode of addition of various components to the polymerization system is not particularly restricted but the following modes may be mentioned as examples.

(1) Ethylene, vinyl acetate monomer, the polymerization solvent, the hydroxylactone compound and the polymerization catalyst are fed each independently to the polymerization system.

(2) A solution of vinyl acetate monomer and hydroxylactone compound in the polymerization solvent is fed to the polymerization system and, further addition of the polymerization catalyst, ethylene is fed under high pressure.

(3) A solution of vinyl acetate monomer in the polymerization solvent is fed to the polymerization system and, further addition of a mixture of said catalyst and hydroxylactone compound, ethylene is fed under high pressure.

(4) A mixture of vinyl acetate monomer and hydroxylactone compound is fed to the polymerization system and, further addition of said catalyst and polymerization solvent either independently or as a mixture, ethylene is fed under high pressure.

In any of these modes (1)~(4), all or a part of the necessary amount of ethylene may be first dissolved in the vinyl acetate monomer or polymerization solvent before feeding to the polymerization system. Among the above modes, the modes (2) and (4) are particularly preferred. Moreover, in case vinyl acetate monomer is added to the catalyst solution in advance, it is preferable that the hydroxylactone compound be also added to the catalyst solution.

As the above components are fed to the polymerization system, the polymerization reaction is initiated. The preferred polymerization temperature for the batch process is 40~80° C. (more preferably 50~75° C., particularly 55~70° C.) and that for the continuous process is 40~120° C. (more preferably 50~100° C., particularly 55~90° C.). When the polymerization temperature is below 40° C., the polymerization time is protracted and in order to hasten the reaction, the catalyst must be used in an increased amount. On the other hand, when the polymerization temperature exceeds 80° C. (batch process) or 120° C. (continuous process), the polymerization reaction tends to become hardly controllable.

The preferred polymerization time for the batch process is 4~10 hours (more preferably 6~9 hours, particularly 6.5~8 hours). In order that the polymerization reaction may be completed within 4 hours, it is necessary to raise the reaction temperature or use the catalyst in an increased amount. Then, the polymerization reaction tends to become hardly controllable. On the other hand, if the polymerization time is longer than 10 hours, the productivity will be adversely affected. In the continuous process, the mean reactor residence time is preferably 2~8 hours (more preferably 2~6 hours, particularly 3~5 hours). If the mean residence time is less than 2 hours, it will be necessary to raise the polymerization temperature and/or use the catalyst in an increased amount and the control of polymerization may become difficult. If the mean residence time exceeds 8 hours, the productivity tends to be unsatisfactory.

From productivity points of view, the rate of polymerization of vinyl acetate is preferably set as high as possible within the range permitting control of polymerization. Taking the batch process as an example, said rate of polymerization (conversion of vinyl acetate) is preferably set at 20~90% (more preferably 30~80%). If the rate of polymerization is less than 20%, the productivity on a commercial scale will be poor and the unreacted vinyl acetate will remain in a large amount. On the other hand, if the rate of polymerization exceeds 90%, the polymerization reaction tends to be hardly controllable. In the continuous process, the rate of polymerization is preferably set at 20~60% (more preferably 25~50%). If the rate of polymerization is less than 20%, the industrial productivity will be poor and much of the vinyl acetate will remain unpolymerized. On the other hand, if the rate of polymerization exceeds 60%, the polymerization tends to become hardly controllable.

As to the ethylene content of the ethylene-vinyl acetate copolymer, an ethylene-vinyl acetate copolymer with the desired ethylene content can be obtained by controlling the ethylene pressure in the polymerization reactor, for instance. There is no limitation on the ethylene content but in consideration of the various physical properties of saponified ethylene-vinyl acetate copolymer which will be described hereinafter, the ethylene content of the copolymer is preferably controlled within the range of 5~70 mole % (more preferably 1060 mole %, particularly 20~50 mole %) If the ethylene content is too small, the saponification product of such an ethylene-vinyl acetate copolymer will show poor melt-moldability and the gas-barrier properties of the moldings in a high-humidity environment will be markedly decreased. On the other hand, if the ethylene content is too large, melt-molding of the saponified ethylene-vinyl acetate copolymer will only give moldings inadequate in mechanical strength and gas-barrier properties.

The ethylene pressure is usually set at about 0.49~10.0 MPa.

In the present invention, within the range not contrary to the object of the invention, the copolymer may contain, in addition to ethylene and vinyl acetate, one or more other copolymerizable ethylenically unsaturated monomer or monomers.

Such copolymerizable monomers include, among others, olefins such as propylene, 1-butene and isobutene; unsaturated acids such as acrylic acid, methacrylic acid, crotonic acid, phthalic acid (anhydride), maleic acid (anhydride) and itaconic acid (anhydride), inclusive of salts and $C_1$–$C_{18}$ mono- or dialkyl esters thereof; acrylamides such as acrylamide, N—$C_1$–$C_{18}$ alkylacrylamides, N,N-dimethylacrylamide, 2-acrylamidopropanesulfonic acid, inclusive of salts thereof, acrylamidopropyldimethylamine and its salts with acids or quaternary salts; methacrylamides such as methacrylamide, N—$C_1$–$C_{18}$ alkylmethacrylamides, N,N-dimethylmethacrylamide, 2-methacrylamidopropanesulfonic acid, inclusive of salts thereof, methacrylamidopropyldimethylamine and its salts with acids or quaternary salts; N-vinylamides such as N-vinylpyrrolidone, N-vinylformamide and N-vinylacetamide; vinyl cyanides such as acrylonitrile and methacrylonitrile; vinyl ethers such as $C_1$–$C_{18}$ alkyl vinyl ethers, hydroxyalkyl vinyl ethers and alkoxyalkyl vinyl ethers; vinyl halides such as vinyl chloride, vinylidene chloride, vinyl fluoride, vinylidene fluoride and vinyl bromide; vinylsilanes such as trimethoxyvinylsilane; allyl acetate, allyl chloride, allyl alcohol, dimethylallyl alcohol, trimethyl(3-acrylamido-3-dimethylpropyl)ammonium chloride, acrylamido-2-methylpropanesulfonic acid and the like.

Furthermore, the ethylene-vinyl acetate copolymer may be post-modified by, for example, urethanation, acetalization or cyanoethylation within the range not contrary to the object of the invention.

The ethylene-vinyl acetate copolymer produced by the above-described method of the invention finds application not only in the fields of adhesives, self-adhesives, paints, fiber/textile processing agents, paper/leather processing agents, binders for various materials, and admixtures for cement and mortar but also a starting material for the production of a saponified ethylene-vinyl acetate copolymer in particular.

The method of producing a saponified ethylene-vinyl acetate copolymer from the above ethylene-vinyl acetate copolymer is now described.

Saponification of the ethylene-vinyl acetate copolymer obtained by the above production process gives the desired ethylene-vinyl acetate copolymer. This saponification reaction is carried out in the presence of a saponification catalyst.

To conduct this saponification reaction, the above ethylene-vinyl acetate copolymer is dissolved in an alcohol (usually, methanol) or an alcohol-containing medium generally at a final concentration of about 30–60 weight % and saponified in the presence of an alkaline catalyst (usually, an alkali metal hydroxide such as sodium hydroxide or potassium hydroxide) at a temperature of 40~140° C.

The preferred degree of saponification of vinyl acetate in the thus-obtainable saponified ethylene-vinyl acetate copolymer is 80–100 mole % (more preferably 90–100 mole %, particularly 95–100 mole %) If the degree of saponification is less than 80 mole %, the saponified ethylene-vinyl acetate copolymer will betray poor thermal stability in melt-molding and the moldings obtained from such saponified ethylene-vinyl acetate copolymer will be drastically decreased in mechanical strength and gas-barrier properties.

The alcoholic solution of saponified ethylene-vinyl acetate copolymer obtained in the above manner can be directly submitted to the next processing but is preferably diluted with water to a suitable concentration for strand-making. Thus, the diluted solution can then be extruded in a coagulation bath comprising water or a water-alcohol mixture.

The resulting strand is cut into pellets and washed with water. The washed pellets are preferably treated chemically, for example by dipping them in an aqueous solution of a treating chemical, such as an acid and/or a salt thereof. The chemical for this treatment includes but is not limited to formic acid, acetic acid, adipic acid, phosphoric acid, boric acid, etc. and their alkali metal salts or alkaline earth metal salts. The particularly preferred chemical is acetic acid.

The pellets prepared as above are melt-molded into the desired article. The melt-molding temperature is preferably about 160–260° C.

For melt-molding, various known additives can be formulated. Thus, reinforcements such as glass fiber, carbon fiber, etc.; fillers; colorants; stabilizers such as hydrotalcite; blowing agents; desiccants; etc. can be mentioned. In melt-molding, the saponified ethylene-vinyl acetate copolymer may be supplemented with a suitable amount of a thermoplastic resin as a resin modifier.

Referring to the melt-molding technology, any of injection molding, compression molding, extrusion molding and other molding techniques can be employed. The extrusion molding technique, among them, includes such versions as the T-die method, hollow molding method, pipe extrusion method, strand extrusion method, profile-die extrusion method and inflation method. By the extrusion molding technique, the saponified ethylene-vinyl acetate copolymer can be formed into a variety of shaped articles (film, sheet, tape, bottle, pipe, filament, contour extrudate, etc.) and even co-extruded in combination with other thermoplastic resin.

While the ethylene-vinyl acetate copolymer has been taken as an example of the vinyl acetate polymer in the above description, the production process described above can be generally applied to cases in which the vinyl acetate polymer is a vinyl acetate homopolymer or a copolymer of vinyl acetate with a copolymerizable monomer or monomers other than ethylene. Furthermore, the saponification product of such homopolymer or copolymer can also be obtained by saponifying said vinyl acetate homopolymer or copolymer generally in accordance with the same process as described above for the production of the saponified ethylene-vinyl acetate copolymer.

EXAMPLES

The following examples are further illustrative of the present invention. In the examples, all "parts" and "%" are by weight unless otherwise indicated.

Example 1

Using a 10-L polymerization reactor (autoclave) ethylene and vinyl acetate were copolymerized in the continuous polymerization mode using the following conditions.

| | |
|---|---|
| Vinyl acetate feed | 1290 g/hr |
| Methanol feed | 200 g/hr |
| t-Hexyl peroxyneodecanoate (t½: 1.42 hr) feed | 116 mg/hr |
| L-ascorbic acid feed (0.005 part based on 100 parts of vinyl acetate) | 65 mg/hr |
| Polymerization temperature | 60° C. |
| Ethylene pressure | 3.8 MPa |
| Mean residence time | 4 hr |

The ethylene content of the resulting ethylene-vinyl acetate copolymer was 32 mole % and the polymerization rate (conversion of vinyl acetate) was 38%.

The ethylene-vinyl acetate copolymer thus obtained was saponified and the resulting saponified ethylene-vinyl acetate copolymer was evaluated as described later herein for the degree of pellet discoloration, emanation of an odor in film-forming, number of fish-eyes in the product film, and clarity of the film.

To 100 parts of a 50% solution of the above ethylene-vinyl acetate polymer in methanol was fed 150 parts of a methanolic solution containing 0.017 equivalent of sodium hydroxide relative to the vinyl acetate unit in the copolymer and a saponification reaction was conducted under a pressure of 0.39 MPa at 120~130° C. for 30 minutes while the by-produced vinyl acetate and methanol were destilled off from the system. The resin concentration of the resulting methanolic solution of saponified ethylene-vinyl acetate copolymer was 30%.

Then, 60 parts of an aqueous solution of methanol with a water content of 62.5% was fed to the methanolic solution of saponified ethylene-vinyl acetate copolymer and the methanol was distilled off under 0.29 MPa at 100~110° C. until the resin concentration of the methanol-$H_2O$ solution of saponified ethylene-vinyl acetate copolymer had increased to 40%, whereby a completely transparent homogeneous methanol/$H_2O$ solution was obtained.

This methanol/$H_2O$ solution of saponified ethylene-vinyl acetate copolymer was extruded in a coagulation bath comprising a mixture of water and methanol (95/5 by weight) and the resulting strand was cut with a cutter means to give pellets of saponified ethylene-vinyl acetate copolymer.

The pellets thus obtained were washed 3 times using 300 parts each of a 0.2% aqueous solution of acetic acid per 100 parts of the pellets and, then, dried to give the objective pellets of saponified ethylene-vinyl acetate copolymer for molding.

The degree of coloration of the pellets was rated according to the criteria given below. Furthermore, the pellets were molded into a film and the degree of an odor evolved in film-forming, the incidence of fish-eyes in the film and the degree of clarity of the film were investigated under the following conditions.

(Degree of Coloration of Pellets)

The degree of coloration of the pellets obtained was visually estimated and rated according to the following criteria.

○: Not discolored

Δ: Discolored slightly yellow

×: Discolored definitely yellow

The saponified copolymer (pellets) was then molded into a sheet under the following conditions.

[Film-forming Conditions]

Extruder: A 40 mm (dia.) extruder

Screw: L/D=28, compression ratio 3.2

Die: Coat-hanger type

| Extrusion temperature: | Cylinder tip | 230° C. |
| --- | --- | --- |
|  | Die | 210° C. |
| Screw speed: 40 rpm | | |
| Film thickness: 30 μm | | |

(Odor)

In the above film-forming process, the odor emanating from the extruder was evaluated by sniffing and rated according to the following criteria.

○: No odor

Δ: Slight odor

×: Definite odor (Fish-Eyes)

The fish-eyes in the film obtained under the above film-forming conditions were counted and rated according to the following criteria.

○: Less than 5 per 100 $cm^2$ of film

Δ: Not less than 5 but less than 10 per 100 $cm^2$ of film

×: Not less than 10 per 100 $cm^2$ of film (Transparency)

The transparency (clarity) of the film obtained under the above film-forming conditions was visually rated according to the following criteria.

○: Very clear

Δ: Slightly cloudy

×: Definitely cloudy

Example 2

Except that erythorbic acid was used in lieu of L-ascorbic acid, the procedure of Example 1 was otherwise repeated to prepare an ethylene-vinyl acetate copolymer with an ethylene content of 32 mole % and a vinyl acetate conversion of 38%. This copolymer was further saponified and evaluated as in Example 1.

Example 3

Except that D-gluconic acid δ-lactone was used in lieu of L-ascorbic acid, the procedure of Example 1 was otherwise repeated to prepare an ethylene-vinyl acetate copolymer with an ethylene content of 32 mole % and a vinyl acetate conversion of 38%. This copolymer was further saponified and evaluated as in Example 1.

Example 4

An ethylene-vinyl acetate copolymer was prepared continuously under the following conditions in otherwise the same manner as in Example 1.

| | |
| --- | --- |
| Vinyl acetate feed | 1290 g/hr |
| Methanol feed | 200 g/hr |
| t-Hexyl peroxyneodecanoate (t½: 1.42 hr) feed | 240 mg/hr |
| L-ascorbic acid feed (0.003 part based on 100 parts of vinyl acetate) | 35 mg/hr |
| Polymerization temperature | 60° C. |
| Ethylene pressure | 5.3 MPa |
| Mean residence time | 4 hr |

The ethylene content of the resulting ethylene-vinyl acetate copolymer was 45 mole % and the conversion of vinyl acetate was 38%.

The ethylene-vinyl acetate copolymer was saponified and evaluated as in Example 1.

Example 5

Except that isobutyryl peroxide [t½: 0.25 hr] was fed in lieu of t-hexyl peroxyneodecanoate at 90 mg/hr, the procedure of Example 1 was otherwise repeated to give an ethylene-vinyl acetate copolymer with an ethylene content of 32 mole % and a vinyl acetate conversion of 29%. This copolymer was saponified and evaluated as in Example 1.

Example 6

In a 10-L polymerization reactor equipped with a stirrer, ethylene and vinyl acetate were copolymerized batchwise in otherwise the same manner as in Example 1.

| | |
|---|---|
| Vinyl acetate charge | 5500 g |
| Methanol charge | 1375 g |
| t-Hexyl peroxyneodecanoate charge | 1.65 g |
| L-ascorbic acid charge (0.003 part based on 100 parts of vinyl acetate) | 165 mg |
| Polymerization temperature | 60° C. |
| Ethylene pressure | 4.8 MPa |
| Polymerization time | 7 hr |

The ethylene content of the resulting ethylene-vinyl acetate copolymer was 38 mole % and the conversion of vinyl acetate was 65%.

The above ethylene-vinyl acetate copolymer was saponified and evaluated as in Example 1.

Example 7

Except that the polymerization temperature was set to 70° C. and the rate of feeding t-hexyl peroxyneodecanoate was adjusted to 50 mg/hr (t½ at 70° C.=0.40 hr), the procedure of Example 1 was otherwise repeated to give an ethylene-vinyl acetate copolymer with an ethylene content of 30 mole % and a vinyl acetate conversion of 30%. This copolymer was saponified and evaluated as in Example 1.

Example 8

Except that the ethylene pressure was set to 5.4 MPa, the procedure of Example 6 was otherwise repeated to give an ethylene-vinyl acetate copolymer with an ethylene content of 44 mole % and a vinyl acetate conversion of 30%. This copolymer was saponified and evaluated as in Example 1.

Comparative Example 1

Except that L-ascorbic acid was not used, the procedure of Example 1 was otherwise repeated to give an ethylene-vinyl acetate copolymer with an ethylene content of 32 mole % and a vinyl acetate polymerization rate of 38%. This copolymer was saponified and evaluated as in Example 1.

The results of evaluations made in Examples 1~8 and Comparative Example 1 are shown in Table 1.

TABLE 1

| | Color of pellets | Odor | Fish-eye | Transparency |
|---|---|---|---|---|
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Comparative Example 1 | x | x | x | x |

In accordance with the present invention, as described above, vinyl acetate is homopolymerized or copolymerized with one or more other monomers in the presence of a hydroxylactone compound and a polymerization catalyst and the resulting vinyl acetate polymer (particularly, ethylene-vinyl acetate copolymer) is saponified to give a saponified vinyl acetate polymer (saponified ethylene-vinyl acetate copolymer).

The invention as such achieves the very rewarding result that the degree of coloration of pellets for melt-molding of the saponified vinyl acetate polymer (particularly the saponified ethylene-vinyl acetate copolymer) is low, that the emanation of an odor in the melt-molding of pellets is sufficiently suppressed, that the clarity of the resulting film is high and that the incidence of fish-eyes in the film is minimal.

What is claimed is:

1. A process for producing a saponified vinyl acetate polymer which comprises polymerizing vinyl acetate or copolymerizing vinyl acetate and one or more other monomers according to solution polymerization in organic solvent or bulk polymerization in the presence of a hydroxylactone compound and a polymerization catalyst which is an organic peroxide or an azo compound having a half-life time ($t^{1/2}$) at 60° C. of 0.1–10 hours, and, saponifying the resulting vinyl acetate polymer or copolymer.

2. A process for producing a saponified vinyl acetate polymer as claimed in claim 1 wherein vinyl acetate and ethylene are copolymerized in the presence of the hydroxylactone compound and the polymerization catalyst to give an ethylene-vinyl acetate copolymer with an ethylene content of not less than 5 mole %.

3. A process for producing a saponified vinyl acetate polymer as claimed in claim 1 wherein the hydroxylactone compound is L-ascorbic acid, erythorbic acid or D-gluconic acid δ-lactone.

* * * * *